W. J. TOWNE.
Ventilating Damper.
No. 44,030.
Patented Aug. 30, 1864.
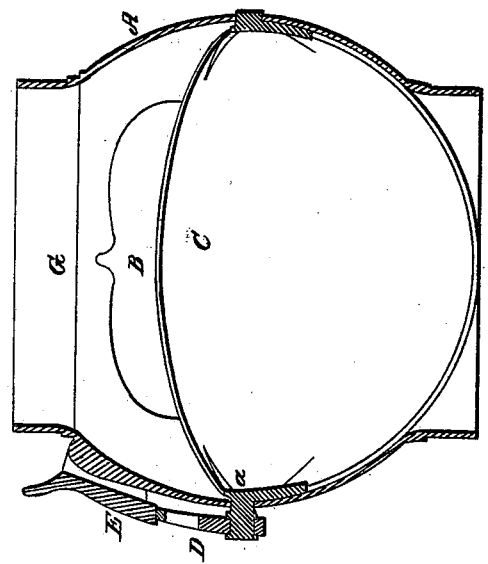
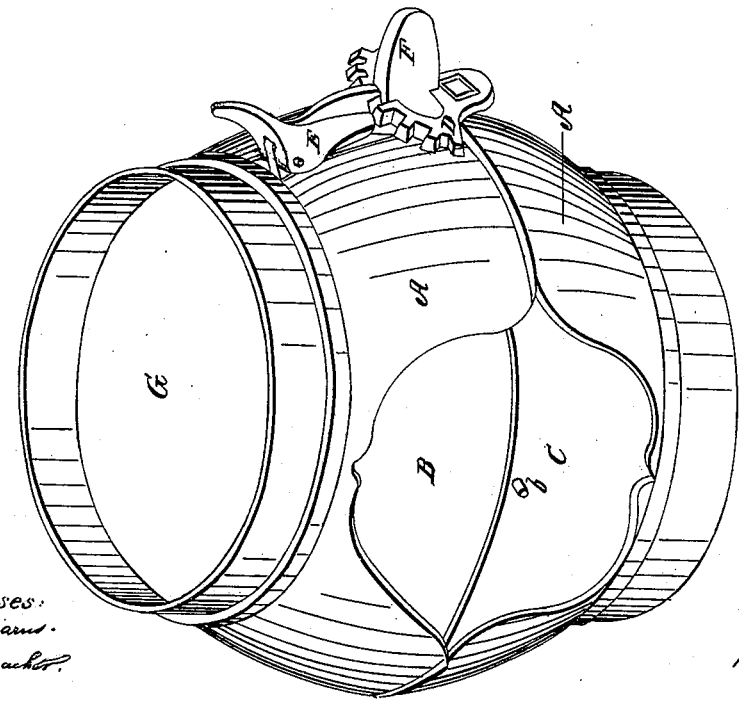

UNITED STATES PATENT OFFICE.

WILLIAM J. TOWNE, OF NEWTON, MASSACHUSETTS.

IMPROVEMENT IN VENTILATING DAMPERS AND REGISTERS.

Specification forming part of Letters Patent No. 44,030, dated August 30, 1864.

*To all whom it may concern:*

Be it known that I, WILLIAM J. TOWNE, of Newton, in the county of Middlesex and State of Massachusetts, have invented certain new and useful Improvements in Ventilating Registers and Dampers for Stoves and Furnaces, of which the following is a full, clear, and exact description, reference being had to the accompanying drawings, making part of this specification, in which—

Figure 1 is a perspective view of my improved ventilating register and damper; Fig. 2, a central vertical section through the same.

My invention relates to an improvement in ventilating registers and dampers for stoves and furnaces for which Letters Patent of the United States were granted to John Magee on the 20th day of May, A. D. 1856, in which a flat damper was used. This was liable to the objection that when placed in a damp situation—as in a cellar—the gases and impurities from the coal would be condensed, collect on the damper, and run down to the spindle or bearings on which it was hung, and rust and clog them and soon destroy them. The rack by which the damper was held in position was also required to be very nicely fitted in order that the flat damper might be closed perfectly tight when there was very little draft, and the crank of the damper was liable to slip out of the notches in the rack if subjected to any jar or by the wind shaking it, when the damper would fall down by its own weight and entirely close the pipe.

The object of my invention is to overcome these difficulties; and it consists in the use of a curved or convex faced damper working within a box or shell, the sides of which are made spherical or convex to correspond to the form of the damper, which is hung or pivoted at or near the center of the box, and is retained open at the required point by a rack and pawl placed directly over one of the bearings, by which arrangement the pawl is not liable to be disengaged from the rack by any shaking or jarring to which it may be subjected. The form of the damper also causes any moisture or deposit which may collect to be carried away from the bearings into the pipe below, thus protecting them from being clogged or rusted, and the damper, being made to project under the edge of the opening which it commands, can always be closed tight when required.

To enable others skilled in the art to understand and use my invention, I will proceed to describe the manner in which I have carried it out.

In the said drawings, A is a spherical box or shell to which the smoke-funnel is connected above and below in the ordinary manner. In one side of this box is cut an air-opening, B, of the required size, which is commanded by the valve or damper C, which is made of a curved or convex form to correspond to the form of the inside of the box A. This damper is pivoted to the box A at or near its center, and to one of its journals $a$ is attached a rack, D, with the teeth of which a pawl, E, engages. This pawl is pivoted to the outer face of the box A immediately over the journal $a$ of the damper, and is not liable to be disengaged from the teeth of the rack by any jar or shaking of the damper by the wind. The rack D is furnished with a projection or handle, F, by which the damper may be operated so as to open the smoke-passage G to any required extent, at the same time closing the ventilating or air inlet B, or to obstruct the smoke-passage and open the air-inlet. The damper is prevented from being thrown too far in either direction by means of a stop or stud, $b$, which strikes against the upper or lower edges of the opening B, thus preventing any liability of gas escaping into the room.

By pivoting the damper at or near the center of the shell A when it is turned up into a position to entirely close the air-inlet B, it will wedge slightly against the shell A, and this, together with the damper being made to project under the upper edge of the opening B, causes it to close the air-inlet tightly when required without the necessity of accurately fitting the teeth of the rack and the pawl to effect this end.

Any moisture or deposit which may collect on the damper C will run down its curved surface into the smoke-pipe and away from the bearings, which are thus prevented from being clogged or rusted out and destroyed.

I do not confine myself to the exact form of the box A and damper here shown, as it is evident that they may be varied without departing from the spirit of my invention so long as the curved or convex form is retained.

What I claim as my invention, and desire to secure by Letters Patent, is—

The curved or convex damper C, pivoted at or near the center of a box, A, of corresponding contour, operating substantially as described, for the purpose specified.

WM. J. TOWNE.

Witnesses:
N. W. STEARNS,
P. E. TESCHEMACHER.